United States Patent
Funahashi et al.

(10) Patent No.: US 7,587,557 B2
(45) Date of Patent: Sep. 8, 2009

(54) DATA SHARING APPARATUS AND PROCESSOR FOR SHARING DATA BETWEEN PROCESSORS OF DIFFERENT ENDIANNESS

(75) Inventors: Kazutoshi Funahashi, Takatsuki (JP); Satoshi Ikawa, Toyono-gun (JP); Masaru Nagayasu, Neyagawa (JP)

(73) Assignee: Panasonic Corporation, Osaka (JP)

( * ) Notice: Subject to any disclaimer, the term of this patent is extended or adjusted under 35 U.S.C. 154(b) by 366 days.

(21) Appl. No.: 10/802,914

(22) Filed: Mar. 18, 2004

(65) Prior Publication Data

US 2004/0230765 A1  Nov. 18, 2004

(30) Foreign Application Priority Data

Mar. 19, 2003  (JP)  ............... 2003-075198

(51) Int. Cl.
G06F 15/16  (2006.01)
(52) U.S. Cl. ............... 711/147; 710/62; 717/159
(58) Field of Classification Search .............. 711/147; 710/62; 717/159
See application file for complete search history.

(56) References Cited

U.S. PATENT DOCUMENTS

| | | | |
|---|---|---|---|
| 5,398,328 A | | 3/1995 | Weber et al. |
| 5,519,842 A | * | 5/1996 | Atallah et al. ............... 711/202 |
| 5,572,713 A | | 11/1996 | Weber et al. |
| 5,574,923 A | * | 11/1996 | Heeb et al. .................... 712/38 |
| 5,630,084 A | | 5/1997 | Ikumi |
| 5,687,337 A | * | 11/1997 | Carnevale et al. ........... 712/204 |
| 5,848,436 A | * | 12/1998 | Sartorius et al. ............ 711/154 |
| 5,907,865 A | * | 5/1999 | Moyer ......................... 711/201 |
| 5,928,349 A | * | 7/1999 | Loen et al. ...................... 712/1 |
| 6,725,369 B1 | * | 4/2004 | Farmer et al. ............... 713/100 |
| 6,760,829 B2 | * | 7/2004 | Lasserre et al. ............. 711/207 |
| 2004/0030856 A1 | * | 2/2004 | Qureshi et al. .............. 711/202 |

FOREIGN PATENT DOCUMENTS

| | | | |
|---|---|---|---|
| FR | 0729093 A1 | * | 8/1996 |
| FR | 0729094 A1 | * | 8/1996 |
| JP | 4-82736 | | 7/1992 |
| JP | 4-362738 | | 12/1992 |
| JP | 6-69978 | | 3/1994 |
| JP | 8-278918 | | 10/1996 |
| JP | 9-330269 | | 12/1997 |
| JP | 2000-3304 | | 1/2000 |
| JP | 2002-351672 | | 12/2002 |

* cited by examiner

*Primary Examiner*—Brian R Peugh
*Assistant Examiner*—Jared I Rutz
(74) *Attorney, Agent, or Firm*—Wenderoth, Lind & Ponack, L.L.P.

(57) ABSTRACT

The data sharing apparatus in the present invention includes a first processor and a second processor, each of a different endianness, that are both connected to the memory via the data bus, in a byte order based on the endianness of the first processor. It also includes an address conversion unit which converts at least one lower bit of an address to indicate a reversed position of data in the data bus, and outputs the converted address to the memory, in the case where the second processor performs a memory access on the shared memory for data with a smaller width than the data bus.

11 Claims, 17 Drawing Sheets

FIG. 8

| Input | | Output |
|---|---|---|
| Access size | Address | Converted address |
| w (32 Bits) | A1, A0 | A1, A0 |
| hw (16 Bits) | A1, A0 | $\overline{A1}$, A0 |
| B (8 Bits) | A1, A0 | $\overline{A1}$, $\overline{A0}$ |

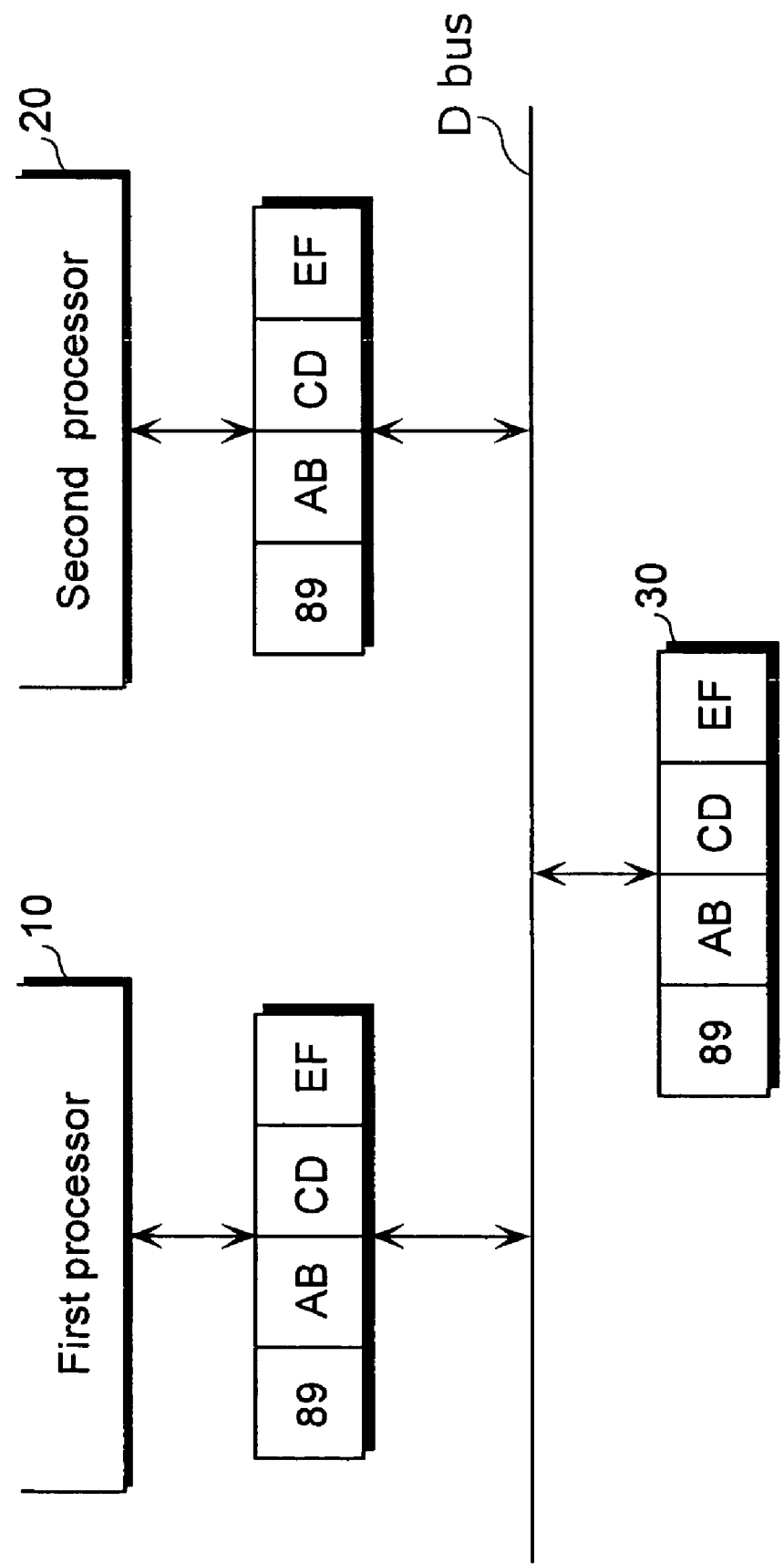

FIG. 18

| Input | | | Output |
|---|---|---|---|
| Endian | Access size | Address | Converted address |
| Same | ✗ | A1, A0 | A1, A0 |
| Different | w (32 Bits) | A1, A0 | A1, A0 |
| Different | hw (16 Bits) | A1, A0 | $\overline{A1}$, A0 |
| Different | b (8 Bits) | A1, A0 | $\overline{A1}$, $\overline{A0}$ |

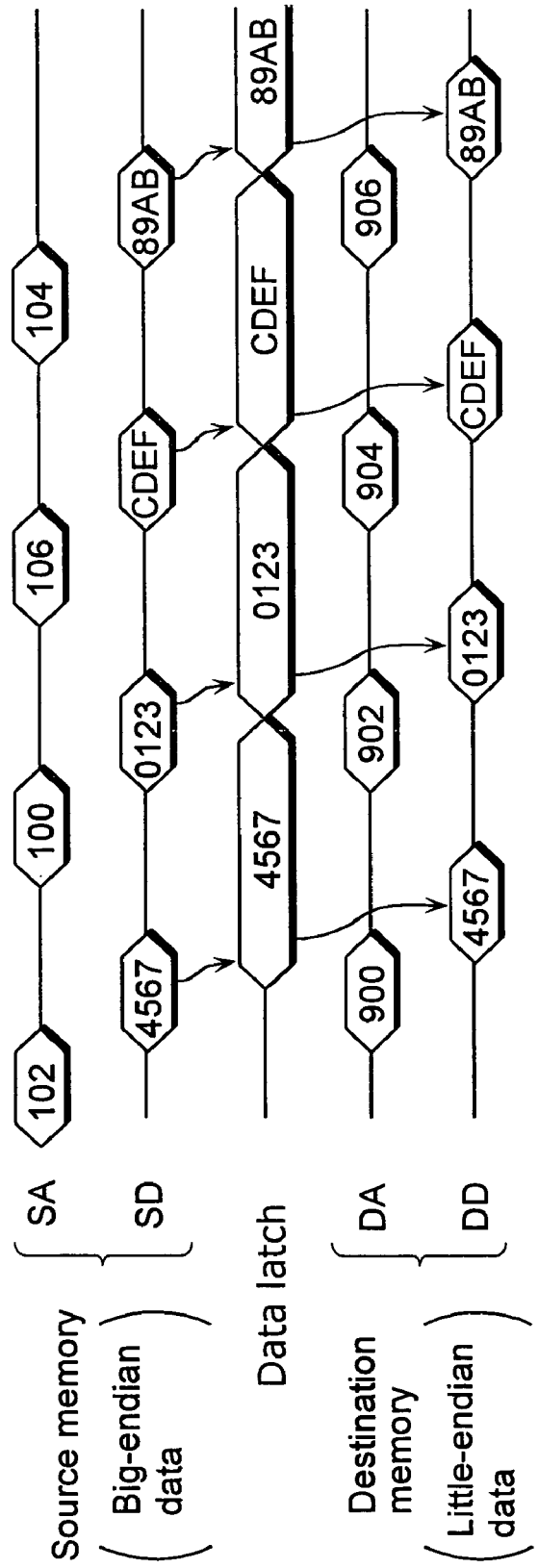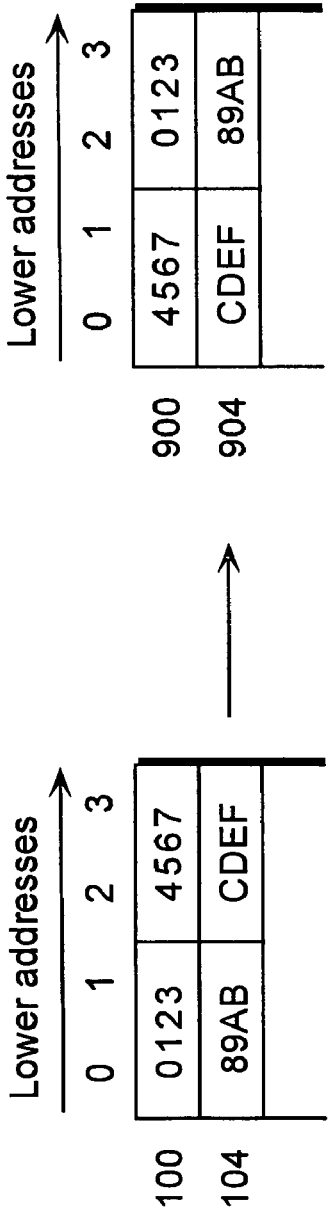
FIG. 19A
FIG. 19B

DATA SHARING APPARATUS AND PROCESSOR FOR SHARING DATA BETWEEN PROCESSORS OF DIFFERENT ENDIANNESS

BACKGROUND OF THE INVENTION (1) Field of the Invention

The present invention relates to a data sharing apparatus containing a memory and two processors of different endianness, as well as such processors for the apparatus, and particularly to data sharing between processors.

(2) Description of the Related Art

In the case where the basic word length of a processor is 2 bytes (16 bits) or more, there are two formats for byte ordering in storing data of 2 bytes or more into a memory, the so-called "big-endian" and "little-endian". This is because the basic word length has 2 bytes or more, as opposed to the byte units in which addresses are assigned in a memory.

First, the big-endian format shall be explained.

Big-endian is a format for the ordering of a byte sequence (byte order) during the storage of data of 2 bytes or more, into a memory having byte unit addresses. It refers to the format that stores data in an ascending order of memory addresses, beginning with the byte at the big end (in other words, the Most Significant Bit (MSB) side. In this case, "B" should stand for byte, rather than bit). However, endian refers to byte sequence ordering and not to bit sequence ordering, so the order of bits within a byte does not change.

FIG. 1 is an explanatory diagram of the big-endian format. For example, in storing a 4 byte data '89ABCDEF' (hexadecimal, hereinafter, the same for all within ' ' marks) into the memory areas addressed 100 to 103 in the big-endian format, the data is stored as '89', 'AB', 'CD', 'EF', sequentially, in the addresses 100 to 103.

FIG. 2 shows the same example as FIG. 1, only that it illustrates a memory image (memory data) having 32 bits as the basic word length. The memory address is in byte units, and the lower address (addressed byte position according to the least significant 2 bits of the address) within the basic word length is, from the left, "0", "1", "2", "3", in ascending order. The most significant byte '89' is stored in the address "0".

In this manner, in the big-endian format, data is stored into memory, in an ascending order of addresses, from the byte on the MSB-side.

FIG. 3 illustrates a typical structure for the connection of a big-endian-type CPU 2 and a memory 3b. A CPU is also simply referred to as a processor.

As shown in the same diagram, the input/output terminals D[31:24], D[23:16], D[15:8], D[7:0] of the CPU 2 are connected, respectively, to the lower addresses "0", "1", "2", "3" of the memory 3b, via a data bus. As a result, byte data is stored, in an ascending order of memory addresses, starting from the MSB. Furthermore, in the memory 3b, a memory image of the case where a structure sample 4 is defined in a program for the CPU 2, is shown. A LONG INTEGER w is word data in the basic word length (32-bit) composed of the 4 bytes, w3, w2, w1, w0, in sequence from the MSB. The SHORT INTEGER x is half-word data, composed of x1, and x0, in sequence from the MSB. The same is true for a SHORT INTEGER y. CHAR a, b, c, and d, each represent byte data.

Next, the little-endian format shall be explained.

Little-endian refers to the format which stores data in an ascending order of memory addresses, from the byte on the little end (in other words, Least Significant Bit (LSB) side) first.

FIG. 4 is an explanatory diagram of the little-endian format. It shows the same data as in FIG. 1, where the 32-bit data '89ABCDEF' is stored, sequentially, in the addresses 100 to 103, as 'EF', 'CD', 'AB', and '89'.

FIG. 5 illustrates a memory image of the same example in FIG. 4, with 32 bits as the basic word length. Compared to FIG. 2, the lower address sequence is inverted, with "0", "1", "2", "3", starting from the right.

FIG. 6 illustrates a typical structure for the connection of a little-endian-type CPU 1 and a memory 3a. As shown in the diagram, the input/output terminals D[7:0], D[15:8], D[23:16], D[31:24] of the CPU 1 are connected, respectively, to the lower address "0", "1", "2", "3" of the memory 3a, via a data bus. As a result, byte data is stored, in an ascending order of memory addresses, starting from the byte on the LSB-side. Furthermore, in the memory 3a, a memory image of the case where a structure sample 4, the same as in FIG. 3, is defined in a program for the CPU 1, is shown. Compared to the memory image shown in FIG. 3, the byte sequence is in reverse.

As such, big-endian and little-endian are formats for byte sequence ordering, in storing data of 2 bytes or more into a memory, each having an opposite ordering sequence from the other.

Due to such incompatibilities, a structure that converts differences in endianness is necessary in order to preserve the identity of shared data in a system where a big-endian CPU and little-endian CPU co-reside.

Patent Document 1 (See Japanese Laid-open Patent Application No. 06-69978) discloses a packet communication apparatus including an endian conversion unit for converting packet data from a big-endian processor into the little-endian format, during packet communication between a big-endian CPU and a little-endian CPU.

In addition, Patent Document 2 (See Japanese Laid-open Patent Application No. 2000-3304) discloses a data alignment apparatus that performs a memory access by absorbing differences in data size, alignment, and endianness, through the conversion of data to be stored, based on the access address and access size.

However, in the technology disclosed in patent documents 1 and 2, it is necessary to add specialized hardware to processors equipped with an endian conversion unit. Moreover, since delays arise due to endian conversion, the technology poses a barrier to high speed memory access, even carrying with it the problem of hindering the speed of other processors, in the case where data is shared.

Furthermore, in general, image processing is carried out by big-endian processors, with communication being carried out by little-endian processors. With the inclusion of image processing functions in mobile phones in recent years, little-endian processors and big-endian processors have come to be connected to the same bus. This then creates a need for real-time sharing of data.

SUMMARY OF THE INVENTION

The object of the present invention is to provide a processor and memory sharing apparatus that realizes the sharing of memory data through an extremely simple structure, in the case where a big-endian processor and a little-endian processor are connected to a bus.

In order to achieve the above-mentioned objective, the processor in the present invention is a processor connected to a memory via a data bus, comprising an address conversion unit operable to convert at least one lower bit of an address so as to indicate a reversed position of data in the data bus, and output the converted address to the memory, when the processor performs a memory access for the data with a smaller width than the data bus, wherein the processor is connected to the data bus in a way that data is transmitted to and from the memory in a byte order based on an endianness which is opposite to an endianness of said processor.

According to this structure, since the first processor and the second processor access the memory in the same byte order for data with the same width as the data bus, the sharing of data with the same width as the data bus through an extremely simple structure is realized as an effect of the present invention. In addition, through the address conversion unit, it becomes possible for the processor to access the memory for data with a smaller width than the data bus. Furthermore, since the processor can be realized through simple hardware such as the address conversion unit, it does not become an impediment to memory access speed.

Here, the processor (first processor) may be structured to execute a program that defines structure data which includes data that is smaller than a basic word length, said structure data being shared between the first processor and another processor (second processor) of a different endianness via the memory, said data being defined in an order within the basic word length, and said order being in reverse to an order in a definition of said structure data in a program to be executed by the second processor.

According to this structure, data can be shared between the first processor and the second processor via the memory, even for data with a smaller width than the data bus. In the case where the width of the data bus is 32 bits (4 bytes), for example, with the provision of the address conversion unit, the address "0" in terms of the first processor, and the address "3" in terms of the second processor, both indicate the same area in the memory (likewise, the addresses "1", "2" and "3" in terms of the first processor, are the addresses "2", "1" and "0" in terms of the second processor). Furthermore, in the case where the structure data of the first program is defined as being the 4 bytes "B0", "B1", "B2" and "B3", the structure data of the second program is defined as being the 4 bytes "B3", "B2", "B1" and "B0". For the byte data "B0" that is defined as "B0", the first processor accesses the address "0", and the second processor accesses the address "3". In this manner, sharing of data is possible, not only for data access of the same width as the data bus, but also for the case of data access of a smaller width.

Furthermore, the processor may be structured to include a cache memory connected to the data bus in a byte order based on the endianness of the processor, wherein the processor may be structured to read data from the memory through the cache memory in data units of the same width as the data bus.

According to this structure, since data with the same width as the data bus is read from the memory through the cache memory, caching data for a processor of different endianness through an extremely simple structure is possible as an effect of the present invention. In addition, address conversion is not necessary for cache access, and the processor can access data through the same access operation, regardless of whether the particular data is located in the shared memory or the cache memory.

Furthermore, the data sharing apparatus in the present invention is a data sharing apparatus comprising a first processor, a second processor, and a memory, said first and second processors being of different endianness, wherein both the first processor and the second processor are connected to the memory via a data bus, in a byte order based on the endianness of the first processor.

According to this structure, since the first processor and the second processor access the memory in the same byte order for data with the same width as the data bus, sharing of such data, through an extremely simple structure is realized as an effect of the present invention.

Here, the data sharing apparatus may be structured to further include an address conversion unit operable to convert at least one lower bit of an address so as to indicate a reversed position of data in the data bus, and output the converted address to the memory, when the second processor performs a memory access for the data with a smaller width than the data bus.

According to this structure, the second processor is able to access the memory for data with a smaller width than the data bus through the address conversion unit.

Here, the memory stores structure data to be accessed by a first processor and a second processor, the first processor executes a first program that defines the structure data, and the second processor executes a second program that defines structure data which includes data that is smaller than the basic word length, said data being defined in an order within the basic word length, and said order being in reverse to an order in the first program.

According to this structure, sharing of data between the first processor and the second processor via the memory is possible, not only for data with the same width as the data bus, but also for data with a smaller width than the data bus. In addition, uncacheable data (data which cannot be stored in the cache memory) can be shared between processors of different endianness.

Here, the data sharing apparatus may be structured to further include a transfer unit operable to control data transfer by direct memory access (DMA), wherein, in the case where a source and a destination require data of different endianness and data with a smaller width than the data bus is to be transferred, the transfer unit reverses an order of said data within a basic word length, for the source and the destination.

According to this structure, DMA transfer between a source and a destination of different endianness is possible, with the data order required by each, being provided during the DMA transfer. In addition, the processor is able to use the data at the destination (transferred data), even through half-word and word unit access.

Here, the transfer unit may be structured to include a conversion unit operable to convert at least one lower bit of an address of either the source or the destination so as to indicate a reversed position of the data in the data bus, and output the converted address to the memory, in the case where a source and a destination require data of different endianness and data with a smaller width than the data bus is to be transferred.

According to this structure, since the conversion unit only converts lower bits of an address, it can be realized through an extremely simple structure.

Here, the data sharing apparatus may be structured to further include a cache memory connected to the data bus in a byte order based on the endianness of the second processor.

According to this structure, since data with the same width as the data bus is read from the memory through the cache memory, data, for the first processor which has a different endianness, can be cached through an extremely simple structure as an effect of the present invention.

Furthermore, the data sharing method in the present invention is structured in the same way as the above-mentioned data sharing apparatus.

As explained above, according to the data processing apparatus in the present invention, (A) by connecting the big-endian-type second processor to the shared memory, in the same byte order as the little-endian-type first processor (See FIG. 7, bus connection points 42 and 43), data can be shared by the little-endian-type first processor and the big-endian-type second processor through word unit access of the shared memory. In addition, it is possible for the cache memory of the big-endian processor to cache from the shared memory in word units.

In addition, although the addition of (B) address conversion to (A) does not go so far as to enable the second processor to share data by half-word and byte unit access, it does enable access of the little-endian memory.

Furthermore, in addition to (A) and (B), (C) by defining variables which are shorter than the basic word length, in reversed orders within the basic word length, in structure definition within application programs for the first processor and the second processor, data can be shared by the little-endian-type first processor and the big-endian-type second processor, not only through access of the shared memory in word units, but also through access in half-word and byte units Also, in addition to (A) and (B), since during (D) DMA transfer, the same address conversion in (B) is used, data of different endianness is performed of DMA transfer, and data sharing for the source and destination through half-word unit and byte unit access becomes possible.

As further information about technical background to this application, Japanese Patent Application No. 2003-075198 filed on Mar. 19, 2003 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 8 is a diagram showing the input/output logic of the address conversion by the address conversion unit 21.

FIG. 9 is an explanatory diagram of the case where the first processor 10 and the second processor 20 access the shared memory 30 in word units.

FIG. 18 is an explanatory diagram showing the input/output logic of the address conversion by the address conversion unit 104.

FIG. 19A is an example of a time chart illustrating a DMA transfer by the DMAC 32.

FIG. 19B is a diagram showing memory images for the source memory and the destination memory.

DESCRIPTION OF THE PREFERRED EMBODIMENT(S)

First Embodiment

Figure 7:
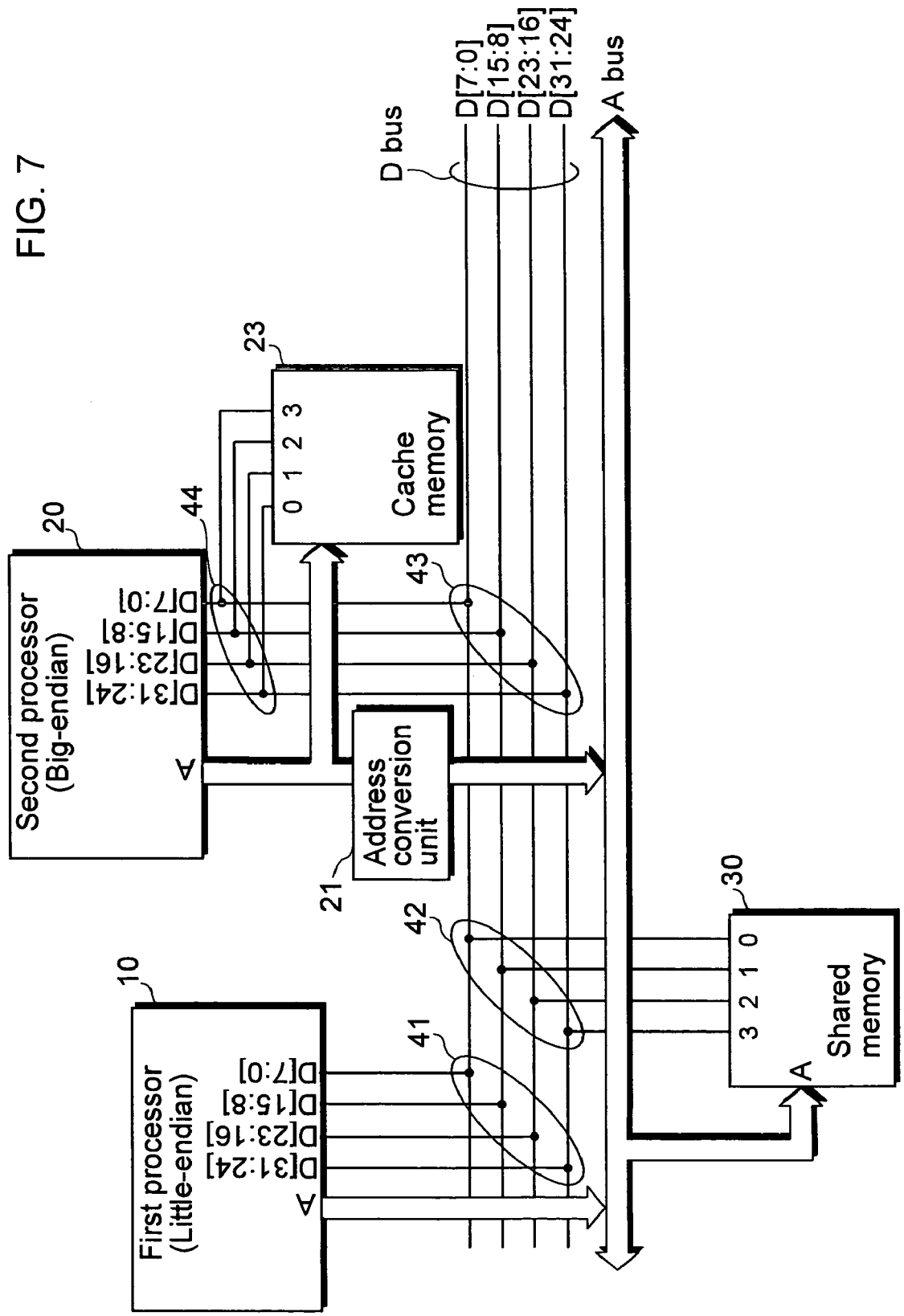
FIG. 7 is a block diagram showing the structure of the data processing apparatus in the first embodiment.

FIG. 7 is a block diagram showing the structure of a data processing apparatus in the present embodiment. As in the diagram, the data processing apparatus includes a first processor 10, a second processor 20, a shared memory 30, an address conversion unit 21, and a cache memory 23, that are connected to each other via a data bus (D bus, in the diagram).

This data processing apparatus achieves the sharing of data in a memory in an extremely simple structure, through the following three points: (A) the big-endian-type second processor 20 is connected to the shared memory 30 with the same byte order as the little-endian-type first processor 10, (B) the address conversion of the second processor 20, and (C) the respective methods in which structures of data in a program are defined by the first processor 10 and the second processor 20, where (A) and (B) are hardware structures, and (C) is a software structure.

(A. Bus Connection)

In FIG. 7, "0", "1", "2", "3" within the shared memory 30 and the cache memory 23 are byte positions to be addressed according to the lower address (here, the lowest two bits of an address).

Figure 6:
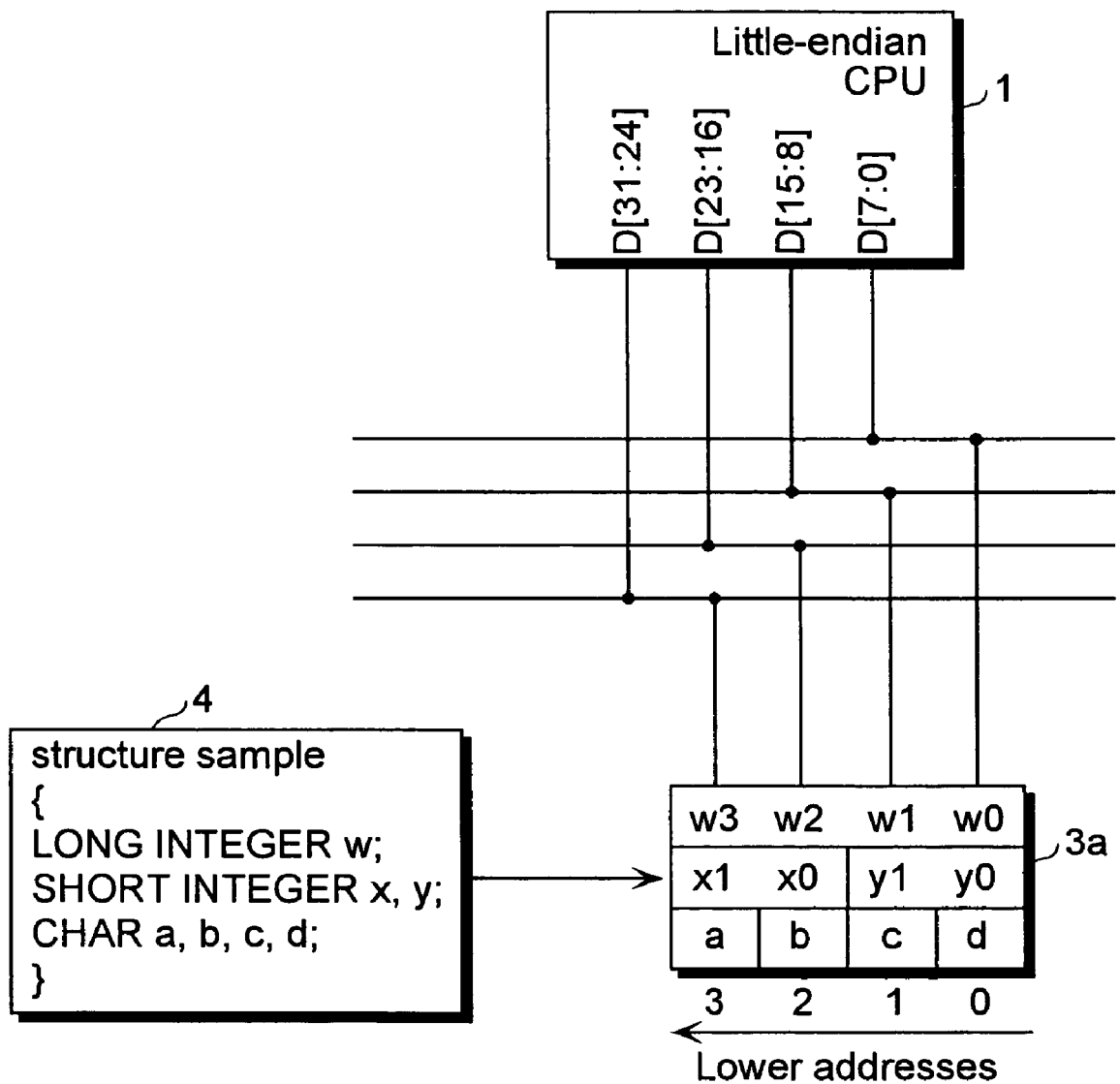
FIG. 6 illustrates a typical structure for the connection of a little-endian CPU and a memory.

The first processor 10 is a little-endian processor, and is connected to the shared memory 30 via the bus connection points 41 and 42. This connection is the same as a typical connection for little-endian processors (See FIG. 6), where the first processor 10 is connected to the shared memory 30 in the little-endian byte order. In other words, as the little end D[7:0] of the data input/output terminal is connected to the address "0" of the shared memory 30, the first processor 10 stores a byte sequence in an ascending order of memory addresses, starting from the little end.

The second processor 20 is a big-endian processor, and is connected to the shared memory 30 via the bus connection points 43 and 42. This connection relates to the above-mentioned (A). That is, this connection method is not the typical big-endian processor connection method (See FIG. 3), but rather the same one as a typical connection for a little-endian processor (See FIG. 6). In this connection, the second processor 20 is connected to the ascending order of addresses in the memory 30, not from the big end, but instead, from the little end byte D[7:0] input/output terminal. To put it in another way, the byte order of the second processor 20 has been switched, from big-endian to little-endian, by way of the bus connection points 43 and 42.

By this connection, the sharing of data through the access of 32-bit data (hereinafter, word) in the shared memory 30 by the first processor 10 and second processor 20 becomes possible. In addition, it also becomes possible to cache (read-in) data into the cache memory 23, in 32-bit units, from the memory 30. However, data sharing through access of 16-bit data (half-word), and 8-bit data (byte) cannot be achieved by this connection alone. This can be achieved, by combining this connection with the previously mentioned (B) and (C).

In the shared memory 30, the byte positions addressed "3", "2", "1", "0", indicated by the lower address (the least significant 2 bits of the address (A1, A0)) correspond to the data input/output terminals D[31:24], D[23:16], D[15:8], and D[7:0] of the first processor 10.

(B. Address Conversion)

The address conversion unit 21 converts the lower address of the second processor 20 for outputting to the shared memory 30. In relation to the above-mentioned (B), this address conversion converts the lower address of data that is smaller than the 32-bit basic word length, to indicate a reversed position within the basic word length, for the concerned data.

FIG. 8 is a table showing the input/output logic of the address conversion by the address conversion unit 21. The inputs for the address conversion unit 21 are "access size" and "address", both of which are inputted from the second processor 20. Access size indicates any from among, a word access, a half-word access, or a byte access. The "address" is the 2 bits from the lowest position on the address bus, in other words, A1 and A0.

The output for the address conversion unit 21 is the "converted address". With regards to the "converted address", as shown in the same table, the address conversion unit 21 outputs A1 and A0, as they are (in other words, without conversion), in the case of a word access. In the case of a half-word access, only A1 is inverted, A0 being outputted as it is. For a byte access, both A1 and A0 are inverted, then outputted. Here, it is assumed that for a word access and a half-word access, the second processor 20 does not access misaligned data.

FIG. 9 is an explanatory diagram of the case of a word access by the second processor 20. In the case where the second processor 20 accesses in word units, it is possible to share the data in the shared memory 30, with the first processor 10. In this case, the address conversion unit 21 does not convert the addresses.

Figure 10A:
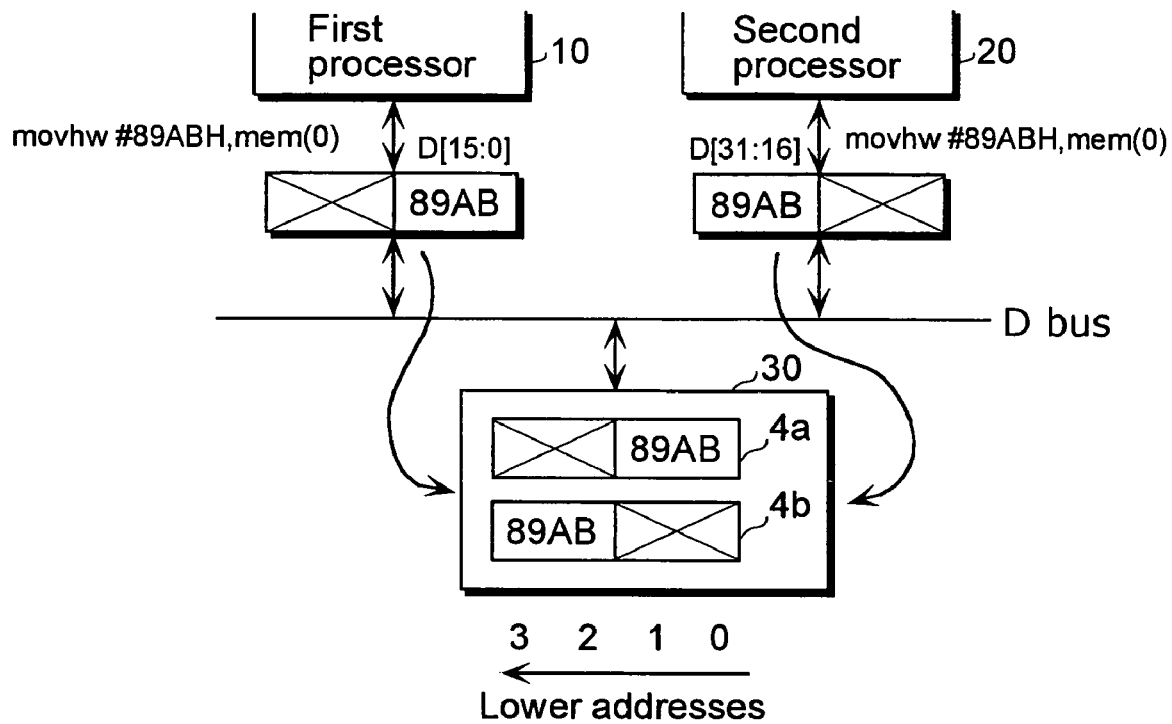
FIG. 10A is an explanatory diagram of the case where the first processor 10 and the second processor 20 access half-word data in the shared memory 30, using the same address.

FIG. 10A is an explanatory diagram of the case of a half-word access by the second processor 20. In a half-word access, the address conversion unit 21 converts the lower address "0" (A1, A0=0, 0) to the lower address "2" (1, 0), and the lower address "2" (A1, A0=1, 0), to the lower address "0". In the same diagram, when the second processor 20 executes an instruction (movhw#89ABh,mem(0)) to store the half-word '89AB' into the address "0", '89AB' is stored in the addresses "2" and "3", as shown in a memory image (memory data) 4b. In contrast, when the first processor 10 executes the same instruction, '89AB' is stored in the addresses "0" and "1", as shown in the memory image 4a.

In this manner, in a half-word access, the lower address "0" in the shared memory 30 in terms of the first processor 10 is the lower address "2" in terms of the second processor 20. Likewise, the address "2" in terms of the first processor 10 is the address "0" in terms of the second processor 20.

Figure 11A:
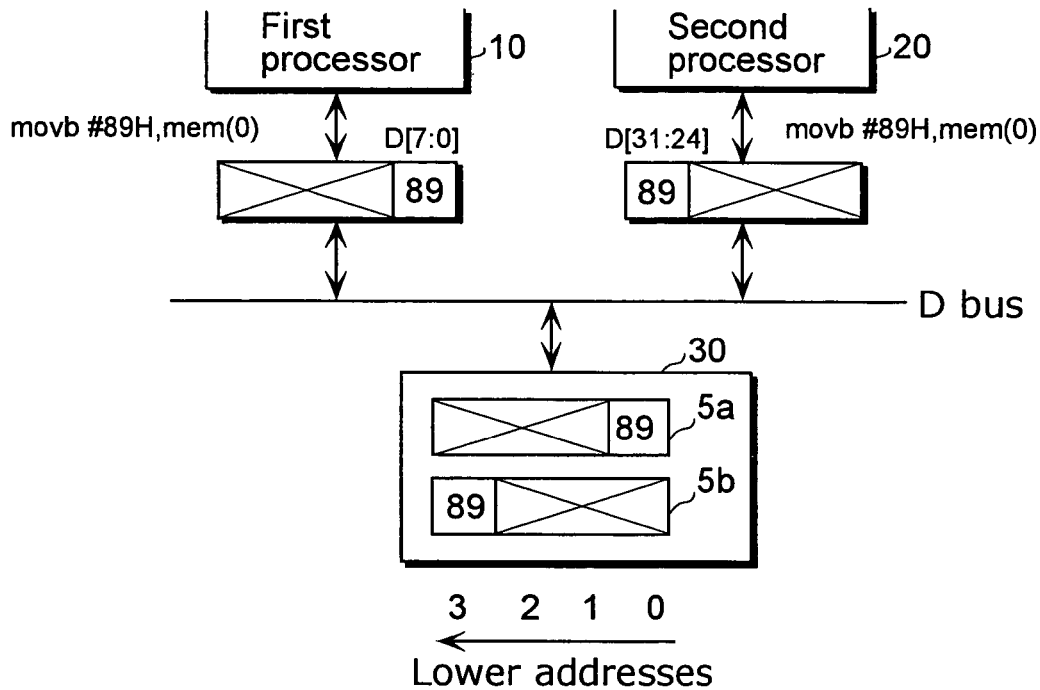
FIG. 11A is an explanatory diagram of the case where the first processor 10 and the second processor 20 access byte data in the shared memory 30, using the same address.

FIG. 11A is an explanatory diagram of the case of a byte access by the second processor 20. In a byte access, for example, the lower address "0" (A1, A0=0, 0) is converted to the address "3" (1, 1) by the address conversion unit 21. In the same diagram, when the second processor 20 executes an instruction (movb#89h,mem(0)) to store the byte '89' into the address "0", '89' is stored into the address "3", as shown in a memory image 5b. In contrast, when the first processor 10 executes the same instruction, '89' is stored in the address "0", as shown in a memory image 5a.

As such, in a byte access by the second processor 20, the lower address "0" is converted to the address "3", the address "1" to "2", the address "2" to "1", and the address "3" to "0" by the address conversion unit 21. In other words, in a byte access, the lower addresses "0", "1", "2", "3" in the shared memory 30, in terms of the first processor 10 are, in terms of the second processor 20, the addresses "3", "2", "1", "0" in the shared memory 30.

Incidentally, even with the addition of the address conversion in (B) to (A), the sharing of data via the shared memory 30, between the second processor 20 and the first processor 10, is still not achieved up to half-word and byte units. There is significance in the point that, together with the switching of byte orders in (A), the address conversion in (B) makes half-word and byte access possible for the second processor 20.

In other words, although without the inclusion of the address conversion unit 21, the second processor 20 can access data from the shared memory 30 in word units, it will no longer be able access in half-word and byte units. For instance, in the example shown in FIG. 10A, the addresses "0" and "1" in the shared memory 30 are a half-word on the lower-side (right-side of the diagram) of the word, as shown in the memory image 4a. However, in outputting to the addresses "0" and "1", the second processor 20 outputs '89AB' to the half-word on the high-side of the word. In this condition, assuming that the address "0" is designated in the shared memory 30 without address conversion, invalid information in the bus will be written into the lower-side half-word (addresses "0", "1") within the shared memory 30, where '89AB' is not inputted.

In this way, the significance of the address conversion in (B) lies in the resolution of half-word and byte access discrepancies arising from the byte data switching in (A). In addition, since the address conversion unit 21 performs on a simple combinational circuit, delays in lower address output brought about by conversion are negligible.

Figure 10B:
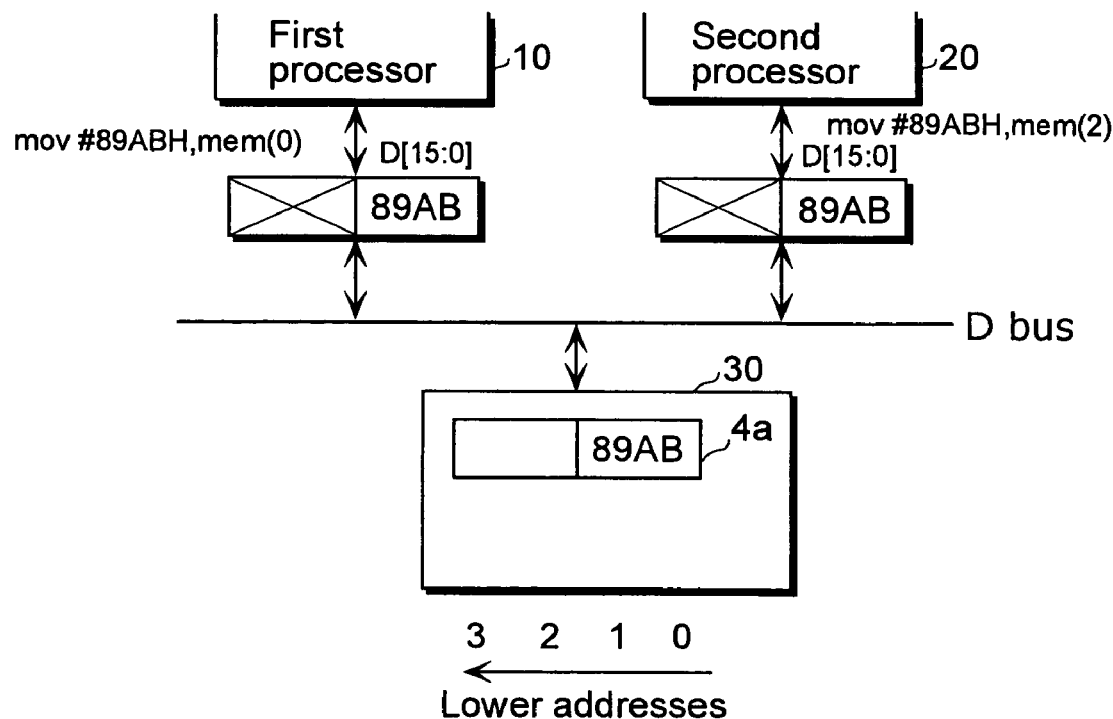
FIG. 10B is an explanatory diagram of the case where the first processor 10 and the second processor 20 access the same half-word data in the shared memory 30, using different addresses.
Figure 11B:
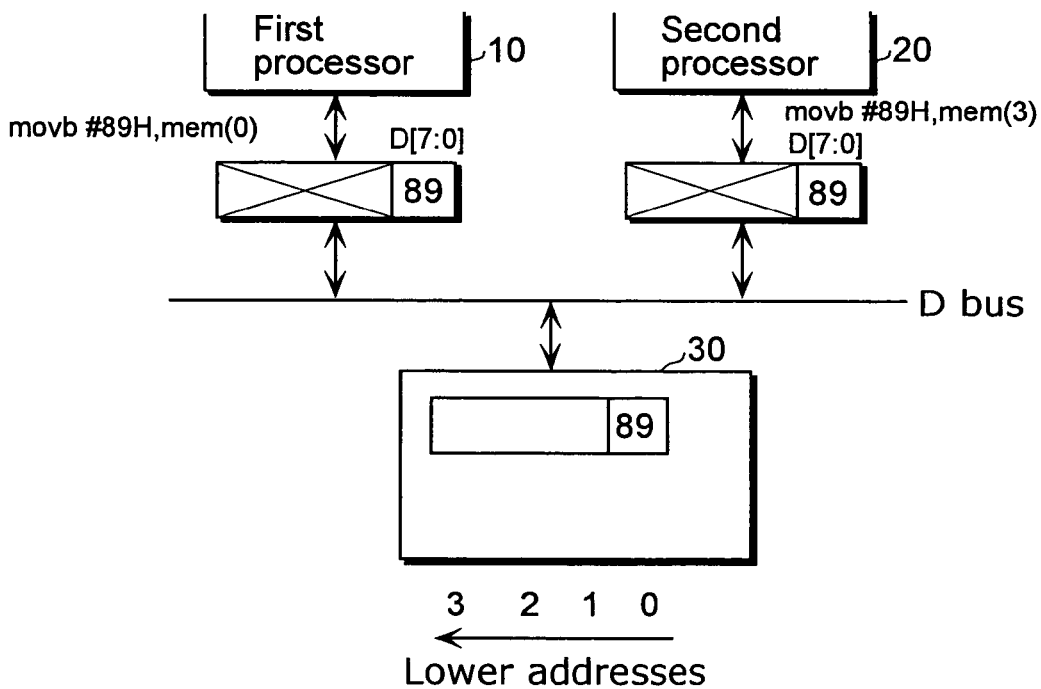
FIG. 11B is an explanatory diagram of the case where the first processor 10 and the second processor 20 access the same byte data in the shared memory 30, using different addresses.

Moreover, with regard to half-words and bytes, since the addresses in terms of the first processor 10, mismatch with the addresses in terms of the second processor 20, as in FIG. 10A and FIG. 11A, data sharing in half-word and byte units is not considered possible. For this mismatch, for example, the first processor 10 and second processor 20 can directly designate the mismatching addresses for shared half-word and byte data, as shown in FIG. 10B and FIG. 11B, thus enabling data sharing, not only in word units, but also in half-word and byte units as well. This point shall be achieved in the present embodiment through the previously mentioned (C).

Figure 1:
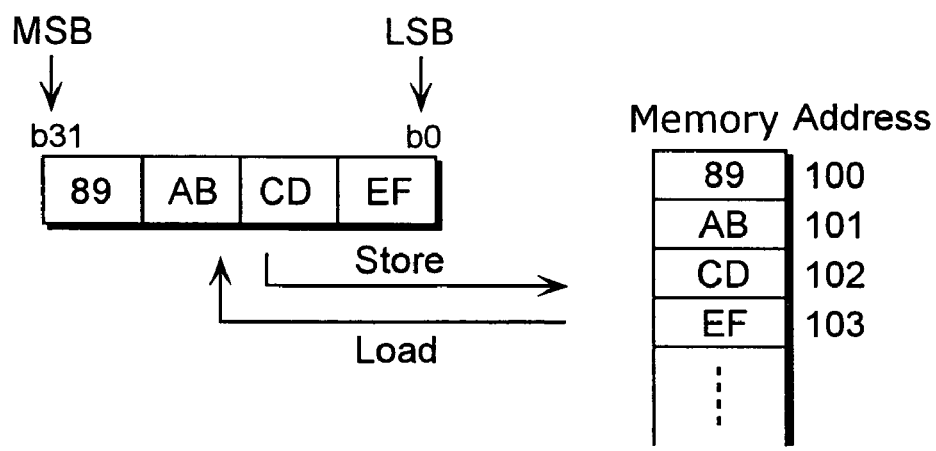
FIG. 1 is an explanatory diagram of the big-endian format.
Figure 2:
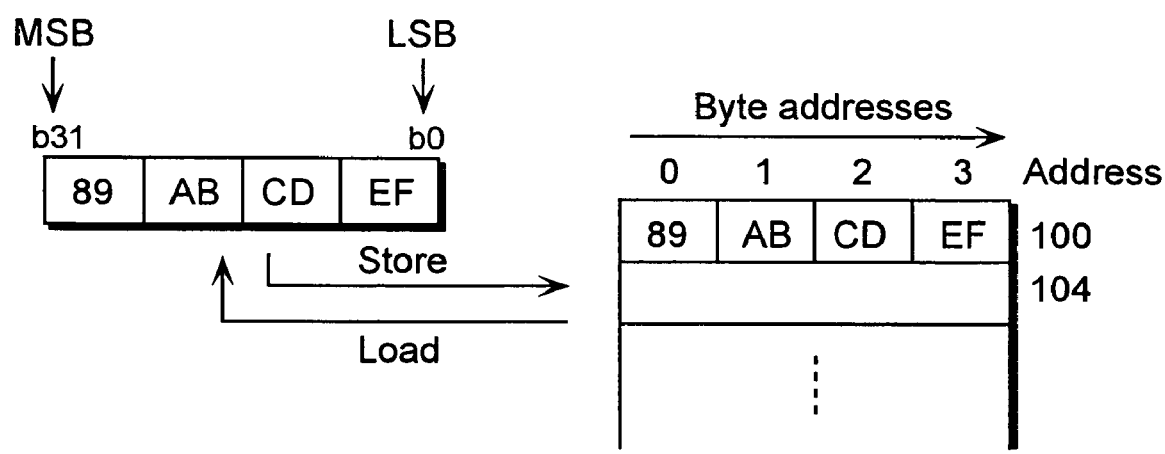
FIG. 2 is an explanatory diagram of the big-endian format.
Figure 3:
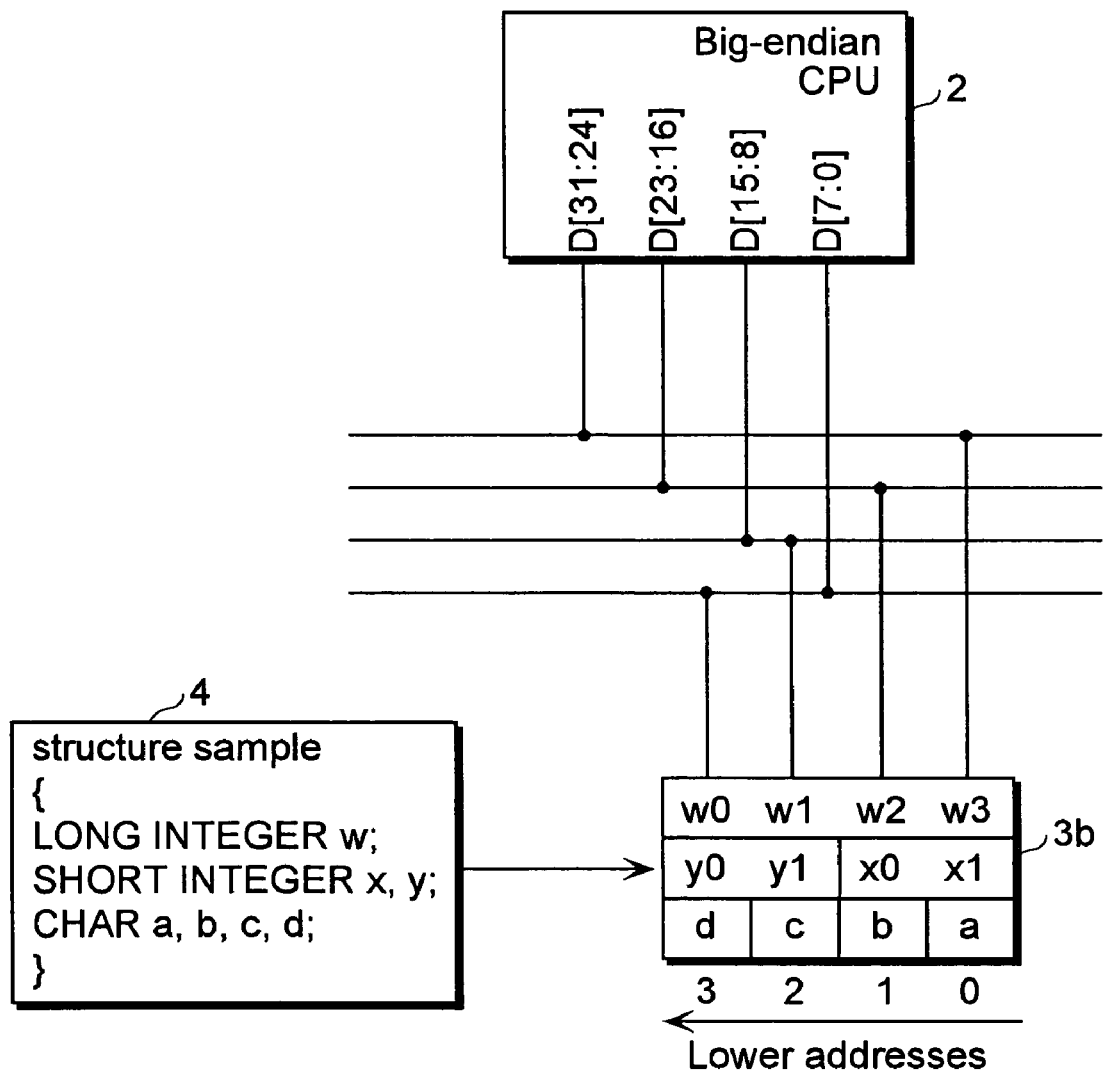
FIG. 3 illustrates a typical structure for the connection of a big-endian CPU and a memory.
Figure 4:
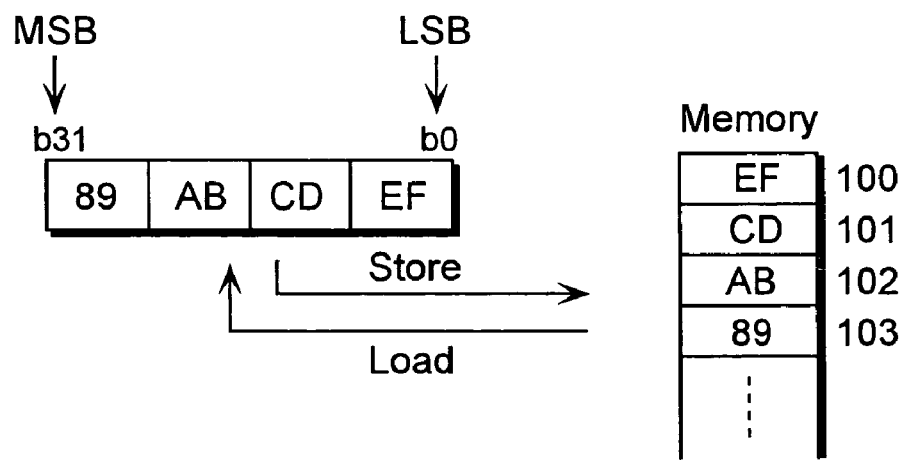
FIG. 4 is an explanatory diagram of the little-endian format.
Figure 5:
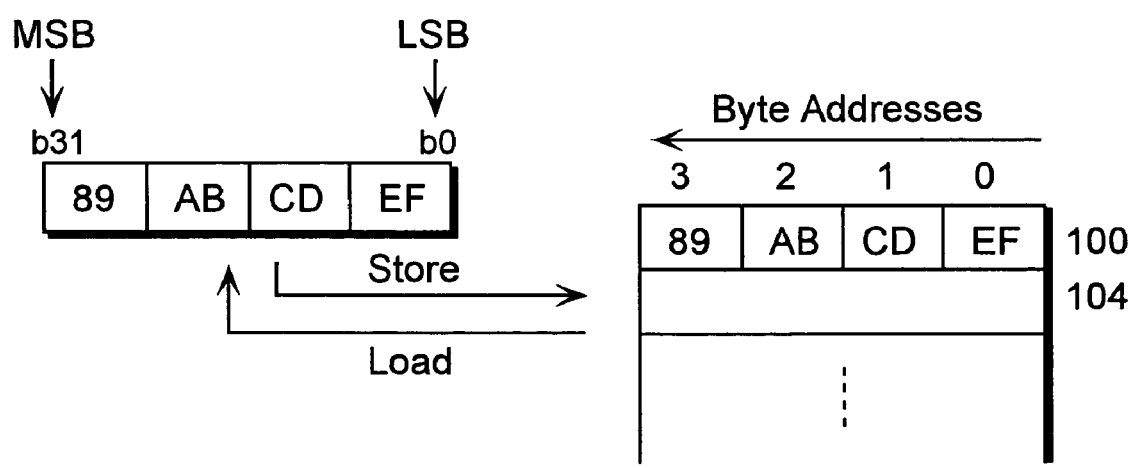
FIG. 5 is an explanatory diagram of the little-endian format.

The cache memory 23 is connected to the second processor 20, via the connection point 44, in a typical big-endian processor and memory connection method (See FIG. 3). In FIG. 7, the cache memory 23 is provided outside the second processor 20. However, it can be included within the second processor 20. The cache memory 23 can cache data from the shared memory 30, in word units. This is done through the previously mentioned byte order switching connection in (A).

Figure 12:
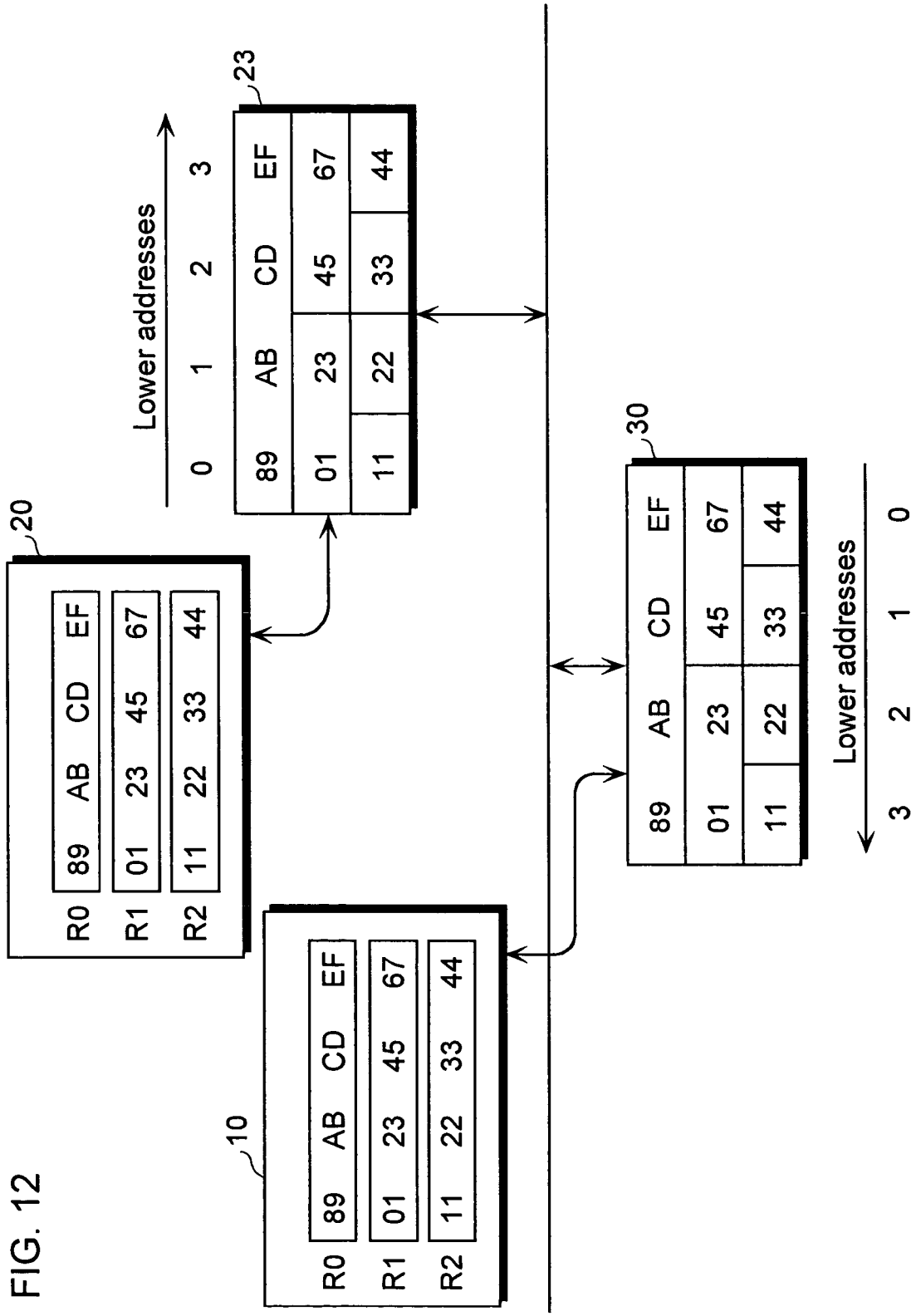
FIG. 12 is a diagram showing memory images for the shared memory 30 and cache memory 23.

FIG. 12 is a diagram showing memory images of the shared memory 30 and cache memory 23. Apart from having different lower address orders, the cache memory 23 is able to hold the same memory image as the shared memory 30 by caching data from the shared memory 30 in word units. However, the cache memory 23 is not able to cache from the shared memory 30, in half-word and byte units, with only the above-mentioned connection in (A).

(C. Structure Definition)

Figure 13:
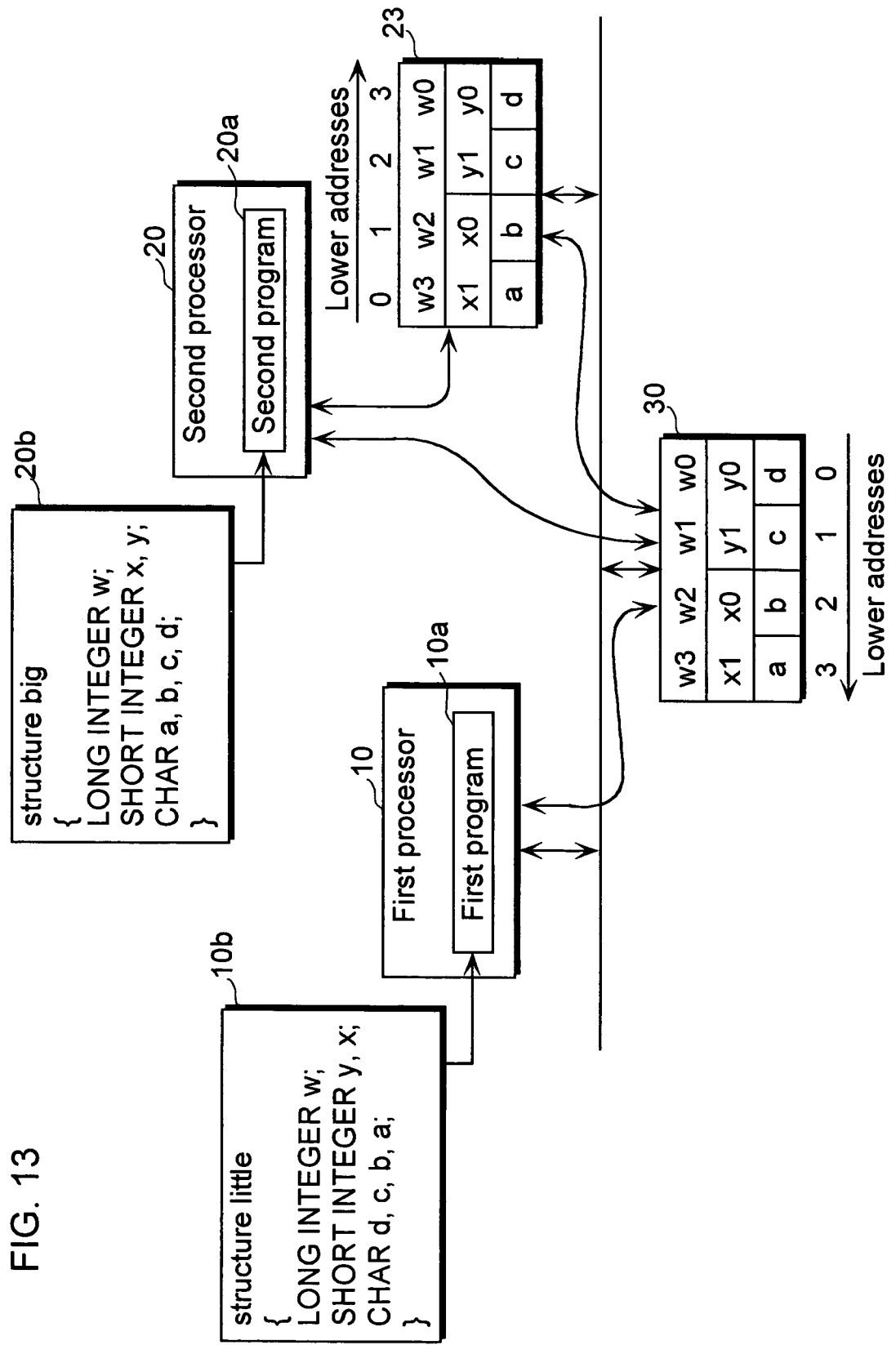
FIG. 13 is an explanatory diagram of data sharing in half-word units and byte units, based on the definition of a structure.

FIG. 13 is an explanatory diagram of the sharing of data in half-word and byte units, through (above-mentioned (C)) structure definition. A first program 10a to be executed by the first processor 10 is generated from a source program which defines a structure 10b. In addition, a second program 20a to be executed by the second processor 20 is generated from a source program which defines the structure 20b. The structure 20b defines the same variables as the structure 10b. However, within the limits of the basic word length, it defines the order of a variable smaller than the basic word length, in reverse order.

For example, the 16-bit integer-type variables x and y are defined as "SHORT INTEGER y, x;" in the structure 10b, and defined in reverse-order as "SHORT INTEGER x, y;" in the structure 20b. Likewise, the character-type variables a, b, c and d are defined as "CHAR d, c, b, a;" in the structure 10b, and defined in reverse-order, as "CHAR a, b, c, d;" in the structure 20b. These structures are described by a programmer, or they may be described in reverse order by a compiler.

As such, by switching within the definitions in the structures, the mismatch of addresses in a half-word and byte access as shown in FIG. 10A and FIG. 11A, can be allowed. In other words, as shown in FIG. 10B and FIG. 11B, it is possible to point out the mismatching addresses, in the case where the first processor 10 and the second processor 20 execute a half-word or byte access for identical variables to be shared.

As shown in FIG. 13, the memory image of the shared memory 30 as defined in the structure 10b, corresponds with the memory image as defined in the structure 20b. However, the lower addresses of half-words and bytes in terms of the second processor 20 are in reverse order to those for the first processor 10 (mismatching). For example, the variable "a" is perceived by the first processor 10 as being stored in the lower address "3", and perceived within the second processor 20 as being stored in the lower address "0". In this manner, the variable "a" can be shared even in a byte access.

In addition, the variable "y" is perceived by the first processor 10 as being stored in the lower addresses "0" and "1", and perceived within the second processor 20 as being stored in the lower address "2" and "3". In this manner, the variable "y" can be shared even in a half-word access.

Moreover, as long as data is defined as the above-mentioned structure to be shared, the cache memory 23 can cache, not only in word units, but also in half-word and byte units.

Figure 14:
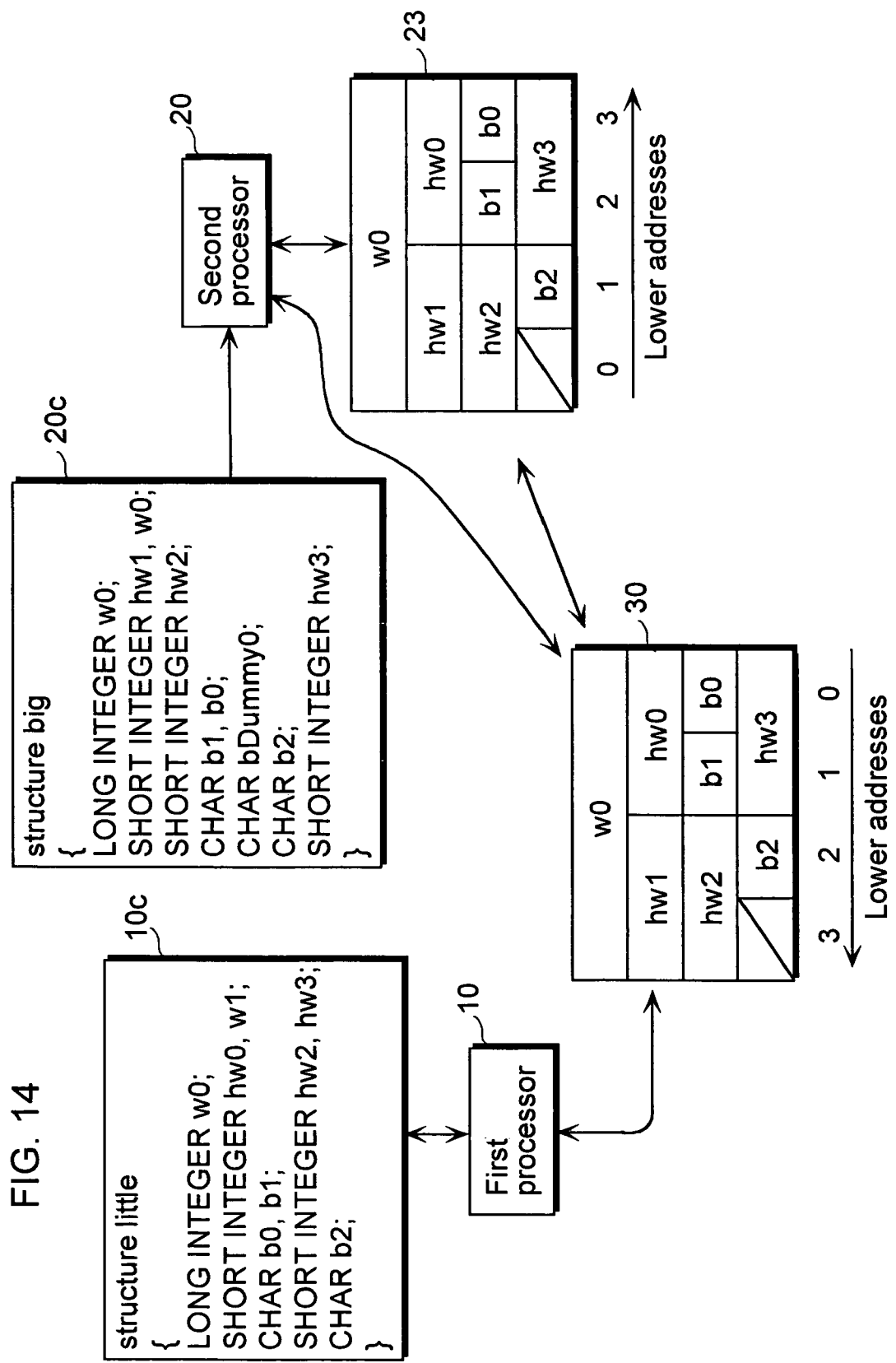
FIG. 14 is a diagram showing an example of another structure definition.

FIG. 14 is a diagram showing an example of another structure definition. In a structure 10c for the first processor 10, an 8-bit blank within the basic word length arises from the definition of the last unsigned 8-bit variable "CHAR b2;". For that reason, dummy byte data "CHAR bDummy0;", of the same bit length as the blank, is inserted into a structure 20c. As a result, in the structure 20c, a bit order, including the 8-bit blank, is defined in reverse order within the basic word length.

Figure 15:
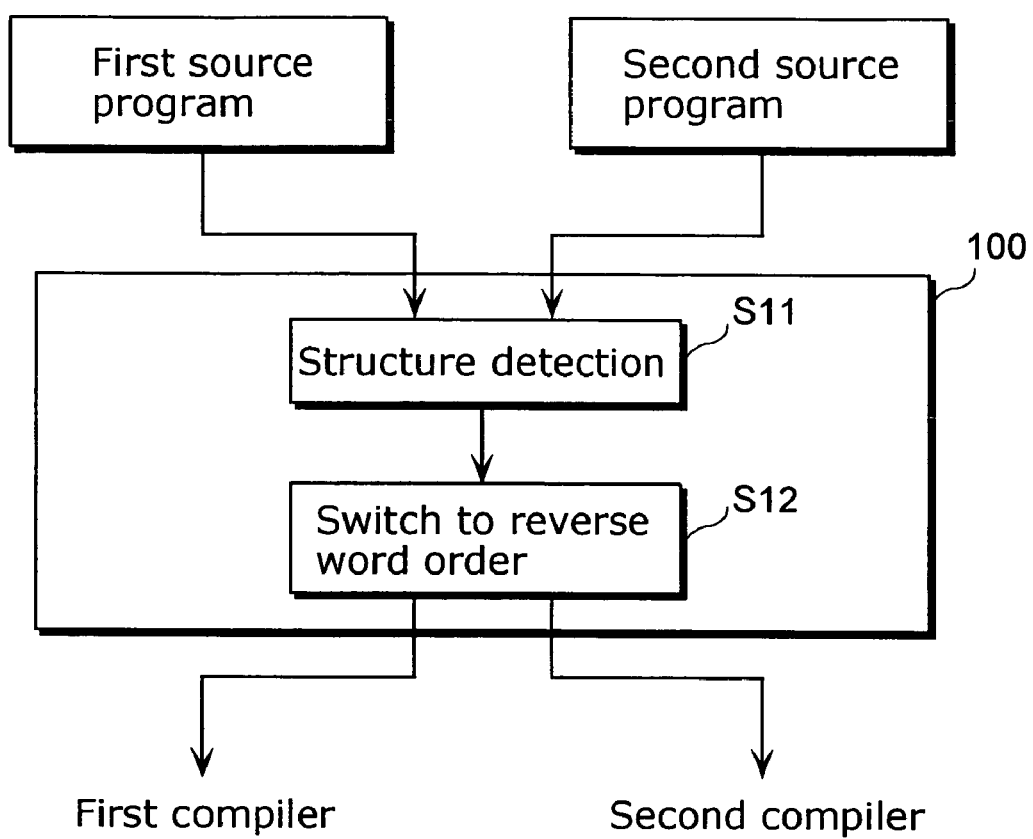
FIG. 15 is a diagram showing the process of reversing the order of a structure definition within a source program.

FIG. 15 is a diagram showing the reverse ordering of a definition of a structure within a program, as pre-processing prior to compiling.

In the diagram, a pre-processing unit 100 receives a first source program for the first processor 10, and a second source program for the second processor 20. It detects structures to be shared by both programs (S11), and switches the order of variables, so that the order of variables within the basic word length for one source program is in reverse to that of the other source program (S12). Here, dummy byte data, as shown in FIG. 14, or a dummy half-word may be inserted, as required. After which, both source programs are compiled in the respective compilers.

As a result, the need for a programmer to dwell on the ordering of structure data to be shared in programming is eliminated, and, as all that is required is to match the names of the variables to be shared, the burden on the programmer can be reduced.

As explained above, according to the data processing apparatus in the present embodiment, sharing of data between the little-endian-type first processor 10 and the big-endian-type second processor 20 by way of word unit access of the shared memory 30 is possible through (A) connecting the big-endian-type second processor 20 to the shared memory 30 in the same byte order as the little-endian-type first processor 10 (See FIG. 7, bus connection points 42, 43). Moreover, the cache memory of the big-endian processor can cache from the little endian shared memory, in word units.

Moreover, although the addition of the address conversion unit 21 (B) to (A) does not necessarily go so far as to enable the second processor 20 to share data through half-word and byte unit access, it does provide access to the little endian memory. For example, the shared memory 30, which is connected to the first processor 10 in a little endian connection method, can be accessed by the big-endian-type second processor 20, as a second processor 20 memory, through the simple structure in (A) and (B).

Furthermore, in addition to (A) and (B), (C) by defining, in the structure definition for the first processor 10 and the second processor 20, a variable that is smaller than the basic word length in reverse order within the basic word length, data can be shared by the little-endian-type first processor 10 and the big-endian-type second processor 20, not only by access of the shared memory 30 in word units, but also in half-word and byte units.

Note that although in the above-mentioned embodiment, the structure in the case where the first processor 10 is a little-endian, and the second processor 20 is a big-endian processor, is explained, the reverse case of endianness is also possible. In that case, the shared memory is connected to both processors as a big-endian memory, and the address conversion unit should be structured to convert the addresses of the little-endian processor.

Moreover, in the above-mentioned embodiment, the basic word length for the first processor 10 and the second processor 20 is assumed as 32 bits. However, a basic word length of another length such as 64 bits or 128 bits is possible. In this case, the address conversion unit 21 should be structured to convert the lower address which indicates the byte position within the basic word length.

Second Embodiment

In the above-mentioned embodiment, the issue of mismatches in half-word addresses and byte addresses arising in (A) and (B), when data in the shared memory 30 is taken from perspective of the first processor 10, and when it is taken from the perspective of the second processor 20, is resolved through the above-mentioned (C). In the present embodiment, a structure for resolving this mismatch by DMA transfer, without using (C), shall be explained.

Figure 16:
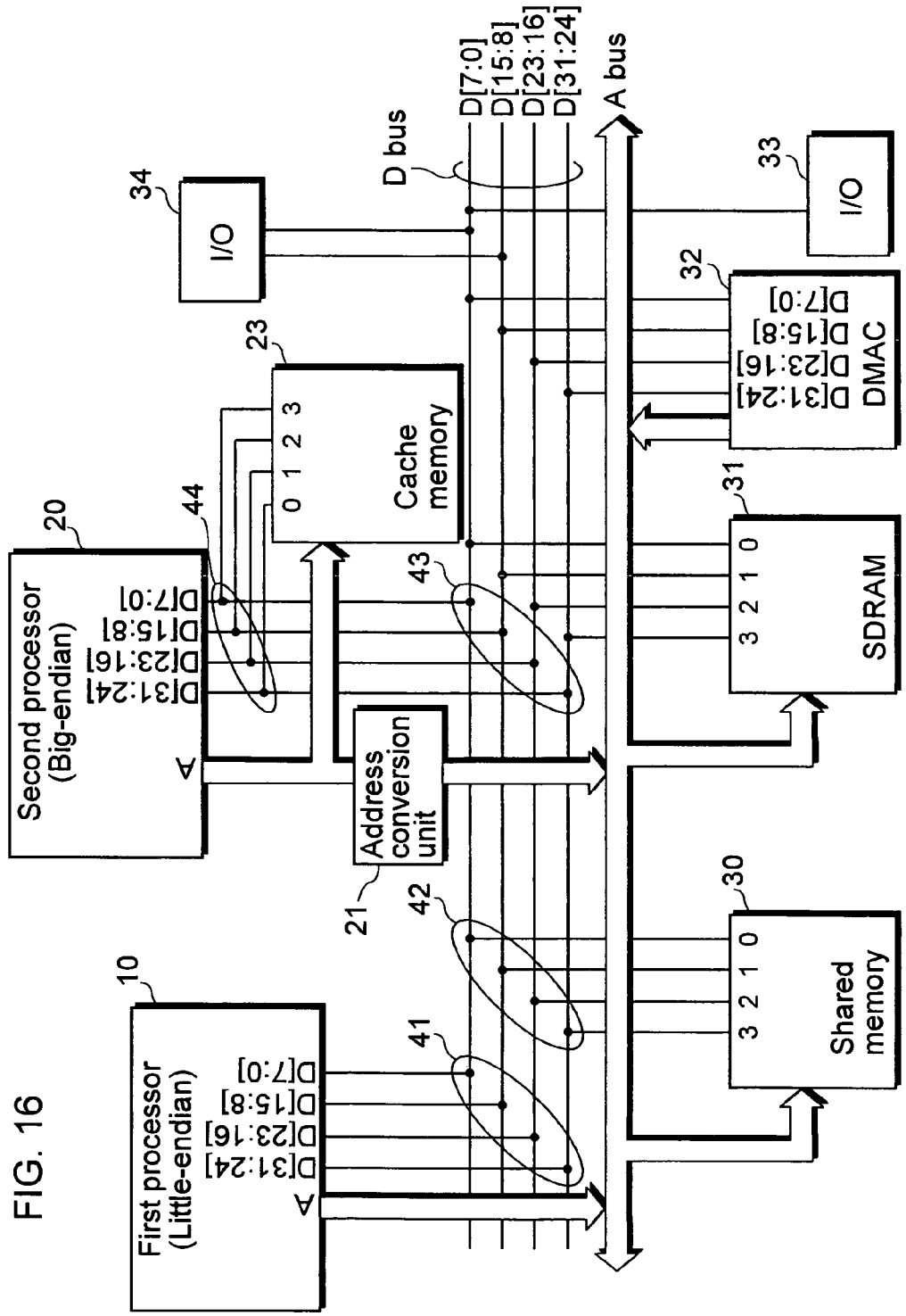
FIG. 16 is a block diagram showing the structure of the data processing apparatus in the second embodiment of the present invention.

FIG. 16 is a block diagram showing the structure of a data processing apparatus in the second embodiment of the present invention. The data processing apparatus in the diagram is different from that in FIG. 7, in having a Synchronous Dynamic Random Access Memory (SDRAM) 31, a Direct Memory Access Controller (DMAC) 32, an Input/Output device (I/O) 33, and I/O 34, added. Structural elements identical to those in FIG. 7 are assigned the same numerals, and explanations will not be repeated. Explanations will focus on the points of difference.

The present data processing apparatus is included in Audio Visual (AV) devices such as a DVD recorder or a digital broadcast receiver. In this case, the second processor 20 performs image processing such as coding and decoding of "Moving Picture Experts Group" (MPEG) based, compressed moving picture data, and the first processor 10 controls the image processing apparatus, as a whole. The shared memory 30 is used in supplying and receiving various types of data between the first processor 10 and the second processor 20.

The SDRAM 31 is used as a work memory by the first processor 10 and the second processor 20. It holds stream data indicating MPEG compressed moving pictures, pictures being decoded, decoded reference pictures, and decoded audio data, and so on.

DMAC32 performs address conversion to switch byte orders, in the case where, during a DMA transfer, the source data and destination data are data of different endianness, and the size of transfer data is smaller than a word. In addition, a DMA transfer is performed between memories, as well as between a memory and an I/O. Here, memory refers to the shared memory 30 and the SDRAM 31, and I/O refers to the I/O 33, I/O 34, and so on.

The I/O 33 and the I/O 34 are 8-bit and 16-bit I/O devices, respectively, and are, for example, video output units for outputting decoded picture data as serial video data, or audio output units that output decoded audio data input as an audio signal, and so on.

Figure 17:
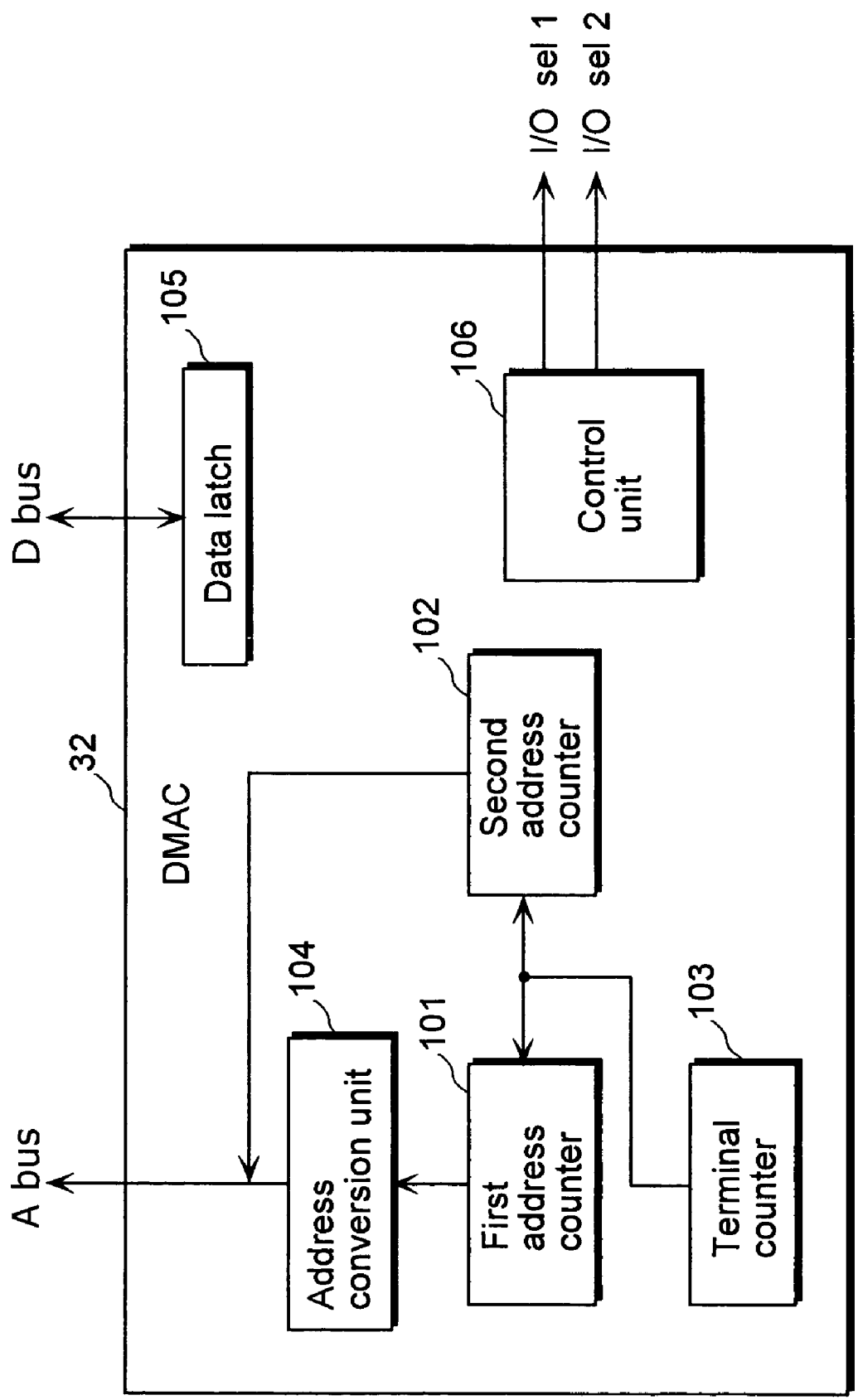
FIG. 17 is a block diagram showing the detailed structure of the DMAC 32.

FIG. 17 is a block diagram showing the detailed structure of DMAC 32. DMAC 32 includes a first address counter 101, a second address counter 102, a terminal counter 103, a data latch 105, as well as a control unit 106.

The first address counter 101 and the second address counter 102 hold source and destination addresses, respectively, and count-up or count-down during each transfer. Note that the opposite correspondence between both address counters and the source and destination is possible.

During burst transferring, the terminal counter 103 informs the control unit 106 when it is finished counting the number of data that need to be transferred, ending the DMA transfer.

In the case where there is a difference in endianness between the source data and the destination data, or between the I/O 33, 34 and the memory data, and data size is smaller than a word, the address conversion unit 104 converts the source/destination addresses outputted from the first address counter 101, to reverse, within the basic word length, the order of the concerned data for the source and the destination.

Here, "difference in endianness" is used to refer to the access of source and destination data by processors of different endianness, or the use of source and destination data by processors and I/O devices of different endianness. An example is the case where source data is loaded/stored by the second processor 20 and destination data is loaded/stored by the first processor 10. Another example is the case where source data is stored by the second processor 20 and the destination is an I/O requiring byte data, sequentially, starting from the LSB-side, and so on.

Furthermore, since the data loaded/stored by the second processor 20 is stored in the memory in the little-endian order, for DMA in word units, DMA transfer can be performed as is, without address conversion by the address conversion unit 104. However, for DMA in half-word and byte units, which are smaller than a word, the addresses in terms of the first processor 10 and the addresses in terms of the second processor 20 mismatch, as shown in FIG. 10A and FIG. 11A. As such, in the case where the source and destination require data of different endianness, the address conversion unit 104 converts addresses to correct the mismatch of addresses in the half-word and byte units.

FIG. 18 is an explanatory table showing the input/output logic of the address conversion by the address conversion unit 104. The inputs for the address conversion unit 104 are "endian", "access size", and "address". The "endian" is inputted from the control unit 106, and indicates whether the source data and destination data are of the same endianness or not. To be more precise, the "endian" indicates whether the processor accessing the source data and the processor accessing the destination data are of the same endianness or not. Moreover, in the case where one of either the source or the destination is an I/O, and the byte order (or half-word order) of the transfer data required by such I/O is in the little-endian order, the "endian" shall be the "same" if the processor accessing the source and destination data is the first processor 10, and "different" if it is the second processor 20. The "access size" is inputted from the control unit 106, and either refers to a word, half-word, or byte. The "address" is the least significant 2 bits of an address, inputted from the first address counter 101.

As shown in the "converted address", in the case where the endianness is the same, the address conversion unit 104 outputs the "address" as it is (without conversion), be it a word transfer, half-word transfer, or byte-transfer. In addition, even if the endianness is different, in the case of a word transfer, the "address" is outputted as it is (without conversion). In the case of different endianness in a half-word transfer, only A1 is inverted for output. In the case of different endianness in a byte transfer, both the bits A1 and A0 are inverted for output.

In this manner, the input/output logic in the case of different endianness in the FIG. 18 is the same as the input/output logic of the address conversion unit 21 shown in FIG. 8. However, what is important is that conversion is performed in order to correct such mismatches as the mismatching half-word and byte addresses for the second processor 20 and the first processor 10, brought about by the address conversion unit 21.

The data latch 105 temporary holds transfer data in memory to memory DMA transfer.

The control unit 106 internally contains a control register accessible to the first processor 10 or the second processor 20. It controls the entirety of the DMAC 32, according to the settings of the control register. The control register holds the start addresses of the source and the destination (in the case of an I/O, its address or as designated by an I/O select signal outputted from the control unit 106), the transfer data size, the endianness of the source and destination (either data accessed by the first processor 10 or data accessed by the second processor 20), and so on.

FIG. 19A is an example of a time chart illustrating a DMA transfer by the DMAC 32. In the diagram, the source memory is, for example, the SDRAM 31, and the destination memory is the shared memory 30. Here, an example is shown where a specified amount of data stored by the second processor 20, in the SDRAM 31 addresses 100 and above, undergoes DMA transfer to the addresses 900 and above, in the shared memory 30. In addition, "SA" indicates source addresses outputted from the first address counter 101 via the address conversion unit 104. "SD" indicates half-word source data read out from a source memory. "DA" indicates destination addresses according to the second address counter 102, and "DD" indicates half-word destination data to be written-into a destination memory.

In this case, the first address counter 101 increments addresses by two, with the address 100 as the start address, and the second address counter 102 increments by two, with the address 900 as its start address. Since it is a DMA transfer of half-words of different endianness, the address conversion unit 104 only inverts "A1". As a result, the source address SA is outputted to the address bus as 102, 100, 106, 104, and so on, and the destination address data is outputted as 900, 902, 904, 906, and so on. In so doing, the source data is transferred, starting from the half word on the little end.

FIG. 19B is a diagram showing memory images of the source memory and destination memory for the DMA transfer in FIG. 19A. As shown in FIG. 19B, the half-word in the source memory lower address "0" is transferred to the destination memory lower address "2", and the half-word in address "2" is transferred to the address "0".

As such, after undergoing a DMA transfer, source data stored by the big-endian-type second processor 20, may be accessed in the destination memory, in half word units by the first processor 10. In this way, the DMAC 32 performs a DMA transfer, correcting the mismatches shown in FIG. 10A and FIG. 11A. The data that was transferred can be accessed in half-word units by the first processor 10, without any mismatch in address. In addition, assuming that the destination address 900 is the I/O 34, supplying half-words, in sequence, from the LSB is possible by DMA transfer. Although DMA transfer of half-words is shown in FIG. 19A and FIG. 19B, the same is true in the case of byte transfer.

Moreover, in the case of DMA transfer between a memory and an I/O, since the control unit 106 outputs a "chip select signal" directly to the I/O, data read out from the memory is transferred directly to the I/O (or a direction opposite to it) without passing the data latch 105. In this case too, for example, data stored by the big-endian-type second processor 20 can be transferred to the I/O from the little end, in byte units or half-word units. The same is also true when the endianness is reversed.

As explained so far, according to the data processing apparatus in the present embodiment, since half-word address and byte address mismatches arising from the afore-mentioned (A) and (B) are corrected by the address conversion unit 104 during DMA transfer, data that has been transferred can be correctly read out by other processors through half-word or byte unit access. This is true even for data which is not defined as structure data in the afore-mentioned (C). In addition, half-word and byte address mismatches in DMA transfer between a memory and an I/O can likewise be corrected by the address conversion unit 104. Whether an I/O needs data from the LSB-side, or data from the MSB-side, the transfer of the required data is possible through the DMAC 32.

Furthermore, instead of converting the addresses outputted from the first address counter 101, it is also possible to have the address conversion unit 104 convert addresses outputted from the second address counter 102.

In addition, in the DMAC shown in FIG. 17, half-word or byte order is switched in destination data, through address conversion during half-word or byte transfer. However, it is also possible to have a structure in which source data is downloaded to the data latch 105 in word units, where it is performed of half-word or byte order switching, then written into the destination memory in word units.

Although the present invention has been fully described by way of examples with reference to the accompanying draw-ings, it is to be noted that various changes and modifications will be apparent to those skilled in the art. Therefore, unless otherwise such changes and modifications depart from the scope of the present invention, they should be construed as being included therein.

What is claimed is:

1. A data sharing apparatus comprising:
   a data bus having a data width;
   a memory which stores data according to a first-endian byte order;
   a first-endian processor logically connected to said memory in the first-endian byte order via said data bus, wherein said first-endian processor executes a first program that utilizes the first endian byte order in which data is defined as being in a defined order;
   a second-endian processor logically connected to said memory in the first-endian byte order via said data bus, wherein said second-endian processor executes a second program that utilizes a second endian byte order in which data that is smaller than the basic word length is defined to be in an order that is reverse of the defined order of the first endian byte order; and
   an address conversion unit operable:
   (i) to invert values of two least significant bits of an address outputted from said second-endian processor and output an address including the inverted values to said memory when said second-endian processor performs a memory access for 8-bit data;
   (ii) to invert a value of a second least significant bit of an address outputted from said second-endian processor and output an address including the inverted value to said memory when said second-endian processor performs a memory access for 16-bit data; and
   (iii) to output an address from said second-endian processor to the memory without address conversion when said second-endian processor performs a memory access for data having the width of the first data bus.

2. The data sharing apparatus according to claim 1, further comprising a transfer unit operable to control data transfer by direct memory access,
   wherein, in the case where a source and a destination require data of different endianness and data with a smaller width than the width of the data bus is to be transferred, the transfer unit reverses an order of said data within a basic word length, for the source and the destination.

3. The data sharing apparatus according to claim 2,
   wherein the transfer unit includes a conversion unit operable to convert at least one lower bit of an address of either the source or the destination so as to indicate a reversed position of the data in the data bus, and output the converted address to the memory, in the case where a source and a destination require data of different endianness and data with a smaller width than the width of the data bus is to be transferred.

4. A data sharing apparatus comprising:
   a data bus having a data width;
   a memory which stores data according to a first-endian byte order;
   a first-endian processor logically connected to said memory the first-endian byte order via said data bus, wherein said first-endian processor executes a first program that utilizes the first endian byte order in which data is defined as being in a defined order;
   a second-endian processor logically connected to said memory in the first-endian byte order via said data bus, wherein said second-endian processor executes a second program that utilizes a second endian byte order in which data that is smaller than the basic word length is defined to be in an order that is reverse of the defined order of the first endian byte order; and an address conversion unit operable:
(i) to invert values of two least significant bits of an address outputted from said second-endian processor and output an address including the inverted values to said memory when said second-endian processor performs a memory access for 8-bit data;
(ii) to invert a value of a second least significant bit of an address outputted from said second-endian processor and output an address including the inverted value to said memory when said second-endian processor performs a memory access for 16-bit data; and
(iii) to output an address from said second-endian processor to the memory without address conversion when said second-endian processor performs a memory access for data having the width of the first data bus,
a cache memory logically connected to the data bus in the second-endian byte order.

5. The data sharing apparatus according to claim 4, further comprising a transfer unit operable to control data transfer by direct memory access,
wherein, in the case where a source and a destination require data of different endianness and data with a smaller width than the width of the data bus is to be transferred, the transfer unit reverses an order of said data within a basic word length, for the source and the destination.

6. The data sharing apparatus according to claim 5,
wherein the transfer unit includes a conversion unit operable to convert at least one lower bit of an address of either the source or the destination so as to indicate a reversed position of the data in the data bus, and output the converted address to the memory, in the case where a source and a destination require data of different endianness and data with a smaller width than the width of the data bus is to be transferred.

7. The data sharing apparatus according to claim 4, wherein the first-endian type is big-endian and the second-endian type is little-endian.

8. The data sharing apparatus according to claim 4, wherein the first-endian type is little-endian and the second-endian type is big-endian.

9. A method of sharing data in a data processing apparatus which includes a first-endian type processor and a second-endian type processor, and a memory which stores data according to a first-endian byte order and to which both processors are connected via a data bus in the first-endian byte order, the method comprising:
causing the first processor to execute a program that utilizes the first endian byte order in which data is defined to be in a defined order, causing the second processor to execute a program that utilizes a second endian byte order in which data that is smaller than the basic word length is defined to be in an order that is reverse of the defined order of the first endian byte order;
(i) inverting values of two least significant bits of an address outputted from the second-endian processor and outputting an address including the inverted values to the memory when the second-endian processor performs a memory access for 8-bit data;
(ii) inverting a value of a second least significant bit of an address outputted from the second-endian processor and outputting an address including the inverted value to the memory when the second-endian processor performs a memory access for 16-bit data; and
(iii) outputting an address from the second-endian processor to the memory without address conversion when the second-endian processor performs a memory access for data having the width of the first data bus.

10. The method according to claim 9, wherein the first-endian type is big-endian and the second-endian type is little-endian.

11. The method according to claim 9, wherein the first-endian type is little-endian and the second-endian type is big-endian.

* * * * *